(12) United States Patent
Pogorelik

(10) Patent No.: US 8,954,748 B2
(45) Date of Patent: Feb. 10, 2015

(54) SYSTEMS AND METHODS FOR CONTROLLING ACCESS TO SUPPLEMENTAL CONTENT INTEGRATED INTO EXISTING CONTENT

(75) Inventor: Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 13/437,702

(22) Filed: Apr. 2, 2012

(65) Prior Publication Data

US 2013/0262874 A1 Oct. 3, 2013

(51) Int. Cl.
*G06F 11/30* (2006.01)

(52) U.S. Cl.
USPC .......................................................... 713/189

(58) Field of Classification Search
USPC .................................. 713/189, 154
See application file for complete search history.

(56) References Cited

U.S. PATENT DOCUMENTS

| | | | |
|---|---|---|---|
| 6,011,849 A * | 1/2000 | Orrin | 380/42 |
| 7,171,021 B2 * | 1/2007 | Yoshida et al. | 382/100 |
| 2008/0148228 A1 * | 6/2008 | Dawson | 717/115 |
| 2010/0008586 A1 * | 1/2010 | Meyer et al. | 382/190 |

* cited by examiner

*Primary Examiner* — Anthony Brown
(74) *Attorney, Agent, or Firm* — Garrett IP, LLC

(57) ABSTRACT

Methods and systems to allow for selective access to supplemental content that is associated with more generally distributed original content. In an embodiment, supplemental content may be encrypted, then integrated with original content using a steganographic technique. The resulting aggregated content may then be made available to users. Users may then extract the encrypted supplemental content from the original content. Those users having the proper privilege level may be given a cryptographic key to allow decryption of the supplemental content. Those without the necessary privilege will not be given this decryption key, and will therefore be unable to access the supplemental content.

30 Claims, 13 Drawing Sheets

SYSTEMS AND METHODS FOR CONTROLLING ACCESS TO SUPPLEMENTAL CONTENT INTEGRATED INTO EXISTING CONTENT

BACKGROUND

The sharing of electronic content among computer users is now commonplace. The content may take the form of text, image, audio, or video data. Moreover, there may be related content that may need to be attached to or integrated with the existing, original content under certain circumstances. An example might be a caption or soundtrack that accompanies an image, or commentary that accompanies text. Such supplemental content may not have the same importance as the original content, but may nonetheless have value to certain users.

In some situations, users may need to be granted access to supplemental content on a selective basis. The supplemental content may be sensitive, and not for widespread distribution. As an example, a business may be willing to publish an employee directory online that includes names and photos, and may be willing to make this available to all employees over an intranet. But it may not be desirable to widely expose certain supplemental content, such as an individual's salary and social security number. Such information may be restricted to certain personnel, such as human resources staff or management personnel. In another example, a business may generate a design specification for purposes of bidding on an engineering contract. Here, the business may wish to include company proprietary information as supplemental content to be shared within the business' engineering department. They may not wish to share this company proprietary information with the firm that is soliciting the bid, however.

In another example, access to supplemental content may be restricted because not everyone in an organization may have the same level of security clearance. A military organization may make a map available to all personnel, but may wish to restrict access to the annotations on the map indicating troop positions. Such annotations would represent supplemental content. Only personnel having the appropriate clearance level should be allowed access to such sensitive supplemental content.

In the context of commercial advertising, a company may wish to present supplemental content to some consumers, but not to all. Here, original content such as an advertisement may be prepared, where the ad includes supplemental content in the form of a coupon code. The company may wish to allow access to the coupon code, but only to existing long-term customers. The company therefore allows selective access to the coupon code, making it available to some consumers, but not to all.

Present technology may allow for convenient general distribution of electronic content, but may not allow for the controlled, selective distribution of associated supplemental content. Enterprise security and privacy requirements may demand supplemental content to be inaccessible to unauthorized parties and be protected from being unlocked and exposed even when detected by an unauthorized application or person.

BRIEF DESCRIPTION OF THE DRAWINGS/FIGURES

Figure 1A:
FIGS. 1A-1C illustrate examples of original and aggregated content according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to allow for selective access to supplemental content that is associated with more generally distributed original content. In an embodiment, supplemental content may be encrypted, then integrated with original content using a steganographic technique. The resulting aggregated content may then be made available to users. Users may then extract the encrypted supplemental content from the original content. Those users having the proper privilege level may be given access to a cryptographic key to allow decryption of the supplemental content. Those without the necessary privilege may not be given this decryption key, and may therefore be unable to access the supplemental content.

Figure 1B:
Figure 1C:
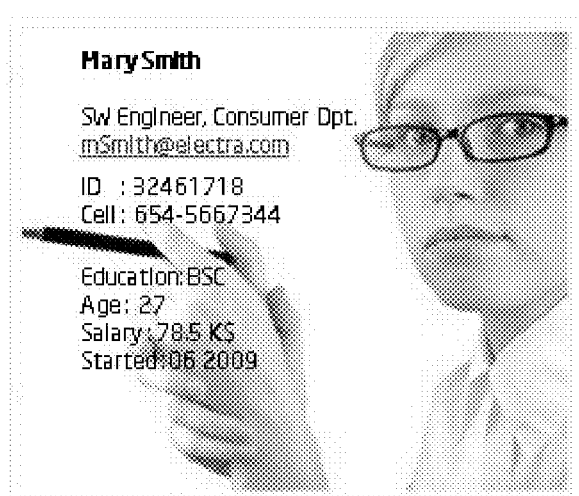

An example of original content and supplemental content is shown in FIGS. 1A-1C. FIG. 1A may represent an entry in an online employee directory, as might be made available to the general public through a company website. FIG. 1B may represent the same directory entry with supplemental content exposed, i.e., the employee's identification number and cell phone number. This latter data might be made available to other employees of the company, but not to the general public.

This supplemental content may be related to and presented with the original content of FIG. 1A. FIG. 1C may represent the original content with additional supplemental content, i.e., the employee's education level, age, salary, and date on which she began her employment at the company. This latter information may not be made available to the general public, or to most other employees of the company. This information may be available only to certain employees, such as managers and human resources staff. The discussion below describes how such supplemental information may be integrated into original content (as shown in the cases of FIGS. 1B and 1C) and accessed by users having the necessary privilege level, according to embodiments.

Figure 2:
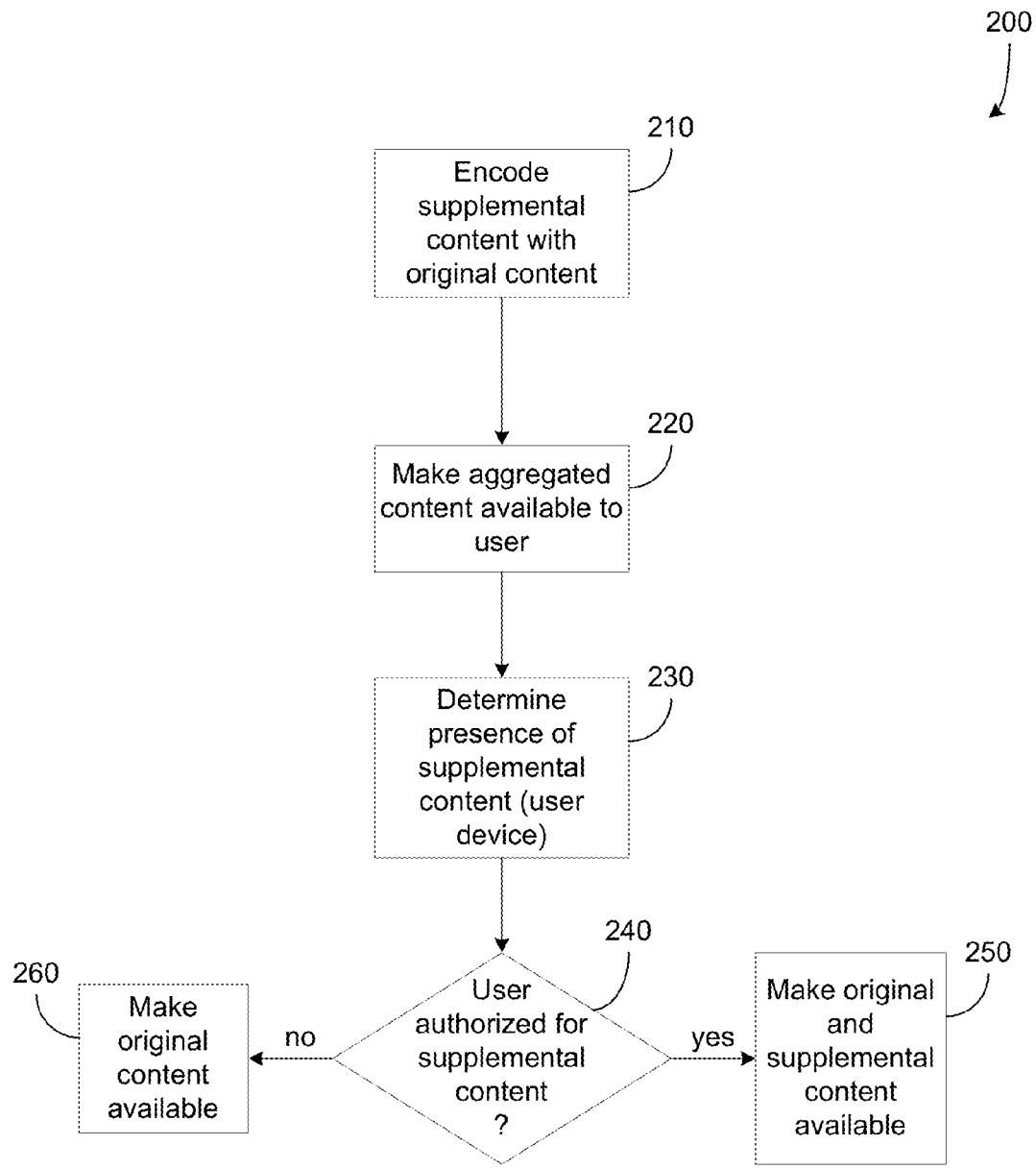
FIG. 2 is a flowchart illustrating overall processing of an embodiment.

The processing used to securely share supplemental content is illustrated generally in flowchart 200 of FIG. 2, according to an embodiment. At 210, an encoding process may take place, where supplemental content may be integrated with existing original content. At 220, the resulting integrated content may be made available to a user.

At 230, the presence of supplemental content in the aggregated content may be determined. In an embodiment, this may be performed at an end user device of the user. Assuming that supplemental content is detected, then at 240, a determination may be made as to whether the user is authorized to access the supplemental content. If the user is so authorized, then at 250, the original content and supplemental content may be made available to the user. If the user is not authorized, then at 260 only the original content may be made available to the user.

Figure 3:
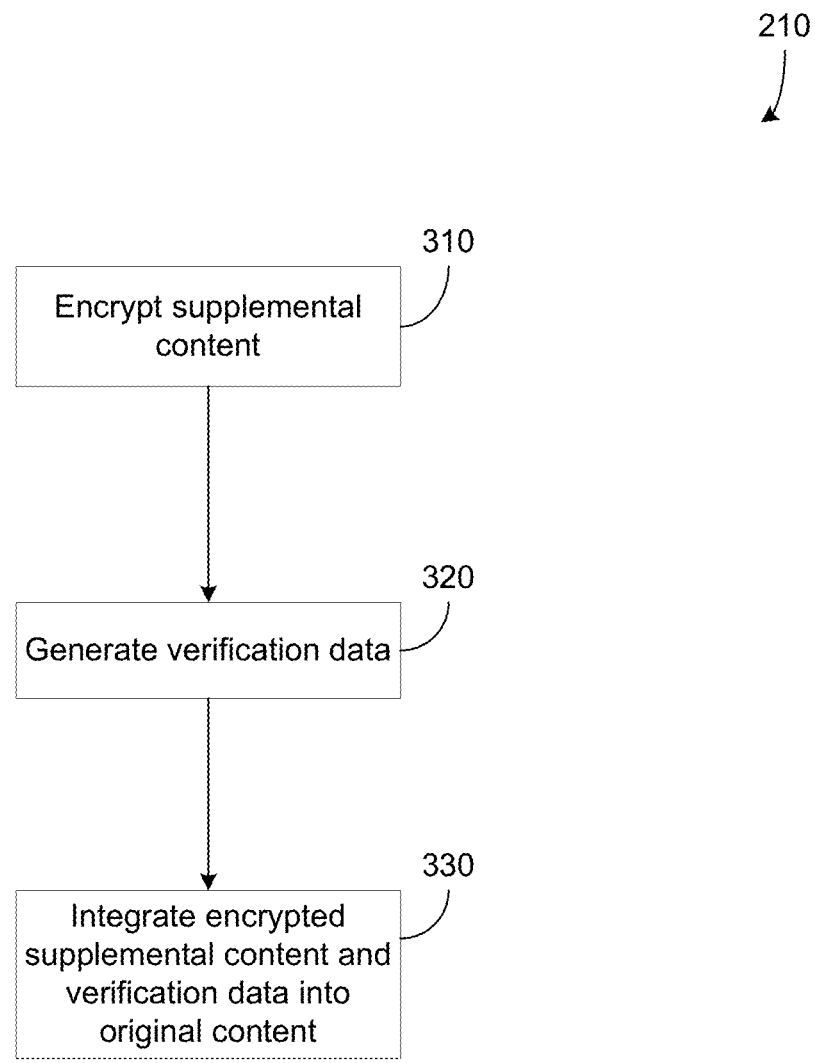
FIG. 3 is a flowchart illustrating the encoding of supplemental content with original content according to an embodiment.

The process of encoding (210 of FIG. 2) is illustrated in FIG. 3, according to an embodiment. At 310, the supplemental content may be encrypted. This may prevent access to the supplemental content by any party not having the necessary decryption key. As will be described in greater detail below, controlling access to the decryption key may serve to control access to the supplemental content.

At 320, verification data may be generated. In an embodiment, the verification data may be a function of the supplemental content. The verification data may be used subsequently by a user to determine the presence of supplemental content, as will be described in greater detail below. The verification data and the encrypted supplemental content may be integrated into the original content at 330.

In an embodiment, the integration process of 330 may be performed using steganographic techniques. These techniques may include the insertion of supplemental content and verification data into original content according to a predefined pattern, such that the resulting aggregated content appears, to the casual user, to be no different from the original content. Any changes in the original content may be essentially imperceptible. For example, elements of the original content may be replaced with elements of the supplemental content and verification data. In the context of electronic content, this replacement may take place at the bit level.

In an embodiment, the original content may include image data, for example. Pixels in the image may be represented by color coordinates (e.g., red, green, and blue coordinates, or RGB) in which the binary value for each coordinate represents intensity. One or more of the least significant bits of the coordinates may be replaced with bits from the supplemental content or the verification data. While this may change the color coordinates, the changes may not be perceptible, given that only the least significant bits are being changed. In this way, the supplemental content and verification data may be inserted into the original content in a manner that is not obvious to the user. Moreover, the resulting aggregated content needs no more capacity than the original content. Note that a significant amount of data may be inserted in this manner. In embodiments, one to three least significant bits of each color coordinate may be used. For a full screen high definition picture having 32-bit color and 1920×1080 pixels, where three bytes are used for color coordinates in each pixel, about 1.5 megabytes would be available if the two least significant bits of each byte are used.

In embodiments, alternative replacement patterns may be possible. Only alternate pixels may be used for example, or only every n-th byte may be used. Moreover, the starting point may vary, so that the pattern may start at the $16^{th}$ pixel, or at a pixel that corresponds numerically to some content-specific parameter, such as the date of file creation.

Analogous steganographic techniques may also be applied if the original content includes one or more audio files. If the original content includes an audio file, the replaced bits may include least significant bits in the digital representation of the audio.

Moreover, in various embodiments, the supplementary content may be image, text, audio, and/or video data.

Figure 4:
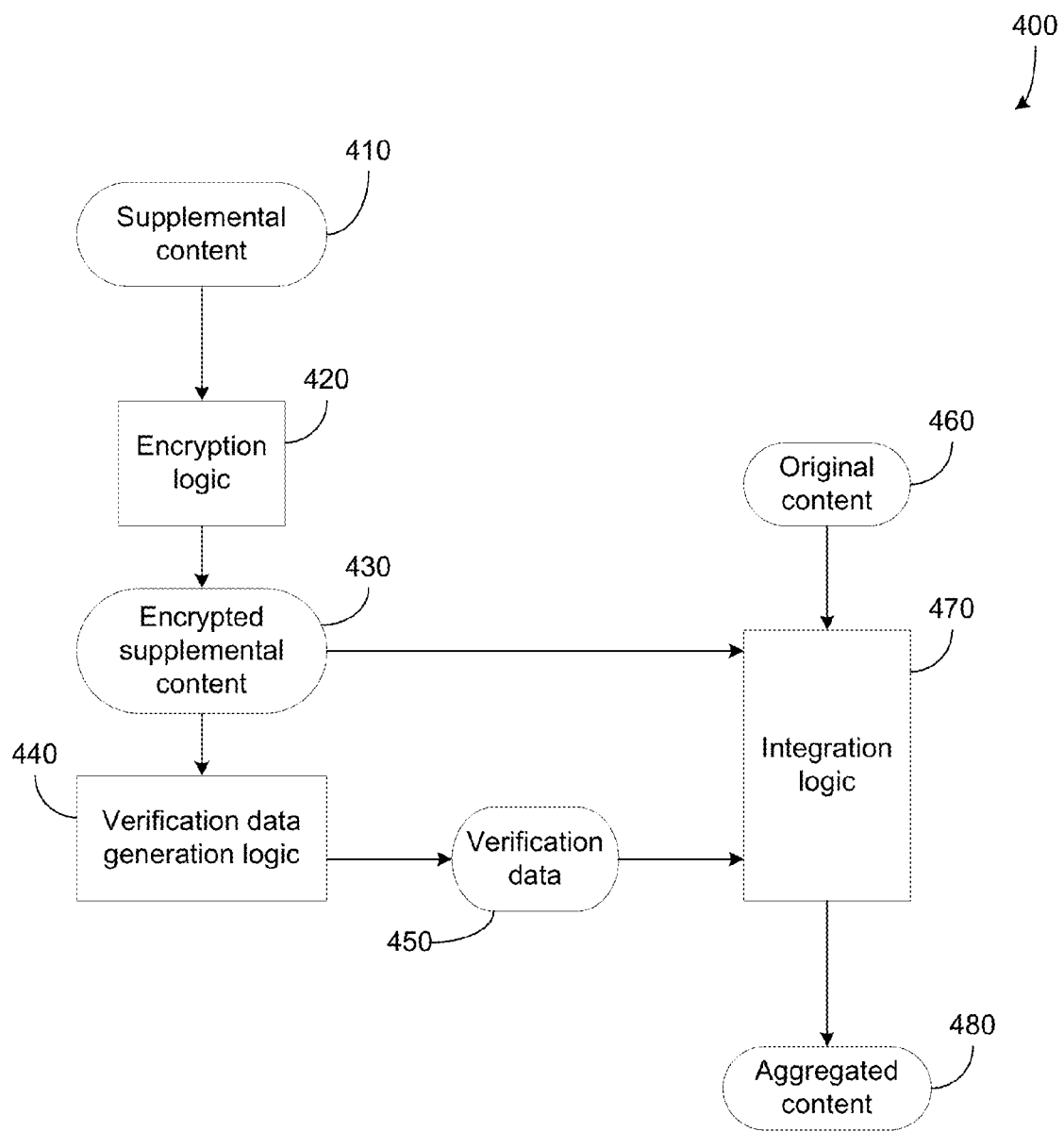
FIG. 4 is a block diagram illustrating a system for creating aggregated content, according to an embodiment.

FIG. 4 illustrates a system 400 that may implement the processing of FIG. 3, according to one embodiment. The supplemental content 410 may be input to encryption logic 420. As noted above, the supplemental content may include image, text, audio, and/or video data. Encryption logic 420 may implement any cryptographic algorithm known to persons of ordinary skill in the art, such as the Digital Encryption Standard (DES), the Advanced Encryption Standard (AES), or an asymmetric public key algorithm such as RSA or Diffie-Hellman, for example. The output of encryption logic 420 is shown as encrypted supplemental content 430. Verification data 450 may be generated by verification data generation logic 440, as a function of the encrypted supplemental content 430. One example of verification data generation may be a cyclic redundancy check (CRC) algorithm or other error detection algorithm. The encrypted supplemental content 430 may be input to integration logic 470, along with the verification data 450. These two pieces of information may be integrated here with original content 460, using a steganographic process as described above. As discussed above, the original content may be image and/or audio data. The output of integration logic 470 may be aggregated content 480.

The aggregated content 480 may therefore have the supplemental content 410 securely integrated therein, in the form of encrypted supplemental content 430. As will be discussed below, someone who is authorized to access the supplemental content 410 may be granted a decryption key enabling him to decrypt the encrypted supplemental content 430. Such a person may therefore be able to access supplemental content 410, in addition to accessing the original content 460. In contrast, someone who is not authorized to access the supplemental content 410 may not be given the appropriate decryption key. Such a party may be able to access the original content 460 in aggregated content 480, but may be unable to decrypt the encrypted supplemental content 430, and therefore may be unable to access the supplemental content 410. This may be true even though the supplemental content 410 is present in the aggregated content 480, in the form of encrypted supplemental content 430.

Returning to the example of FIGS. 1A and 1B, FIG. 1A may represent original content, while FIG. 1B may represent original content plus supplemental content (i.e., the employee's cell phone number and employee ID). An authorized party may be able to see the original content, and to decrypt and see the supplemental content (i.e., FIG. 1B). A party lacking such authorization may see only the original content shown in FIG. 1A. This may be true, even though the supplemental content is present (in encrypted form) in the aggregated content received by both parties. The supplemental content may be visible only to the authorized party. A party who is not authorized to access the supplemental content may not even be aware of the presence of the encrypted supplemental content in the aggregated content.

Returning to FIG. 4, The encryption logic 420, the verification data generation logic 440, and the integration logic 470 may be implemented in software, firmware, or hardware, or any combination thereof. In an embodiment, these modules may be implemented in a plug-in to an application program that processes the original content.

Figure 5:
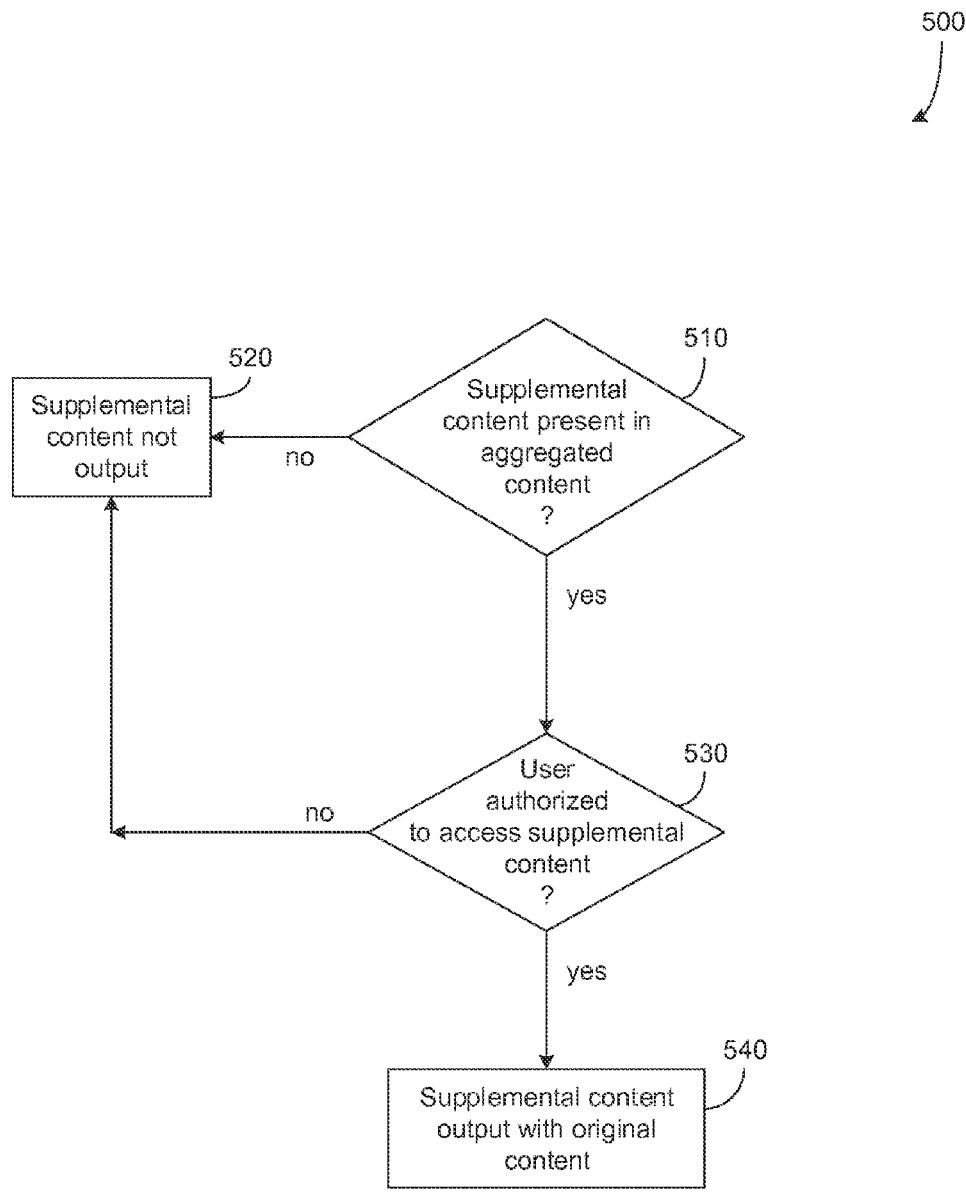
FIG. 5 is a flowchart illustrating the processing of aggregated content, according to an embodiment.

The aggregated content 480 may then be made available to a user. The aggregated content 480 may be sent directly to a user, or may reside on a server where it may be available for subsequent access by the user. Processing at the user side is illustrated in flowchart 500 of FIG. 5, according to an embodiment. At 510, a determination may be made as to whether supplemental content is present in the aggregated content. This determination may use the verification data, as will be described in greater detail below. If there is no supplemental content detected, then there may be no point in any further attempts to extract or process such content. In this case, the aggregated content may contain only the original content, and no supplemental content may be presented, as shown at 520. If supplemental content is detected at 510, then processing may continue at 530. Here, a determination may be made as to whether the user is authorized to access the supplemental content. As noted above, access to the supplemental content may be restricted to certain parties having the appropriate authorization. If the user is authorized to access the supplemental content, then this content may be made available to the user at 540, along with the original content. Otherwise, the supplemental content may not be presented to the user as indicated at 520.

As would be understood by a person of ordinary skill in the art, the determination of whether a user is authorized may be performed in any of several ways. A password and or other user identifier may be required to establish the user's authorization, for example. Alternatively, a biometric authentication mechanism may be used. A cryptographic process may also be used, such as a system of certificates and signatures based on public-key cryptography. If the user fails to establish his authorization to access the supplemental content, the cryptographic key necessary for decryption of this content may be withheld from the user. In this way, a user who is not authorized to access the supplemental content will be prevented from doing so.

Figure 6:
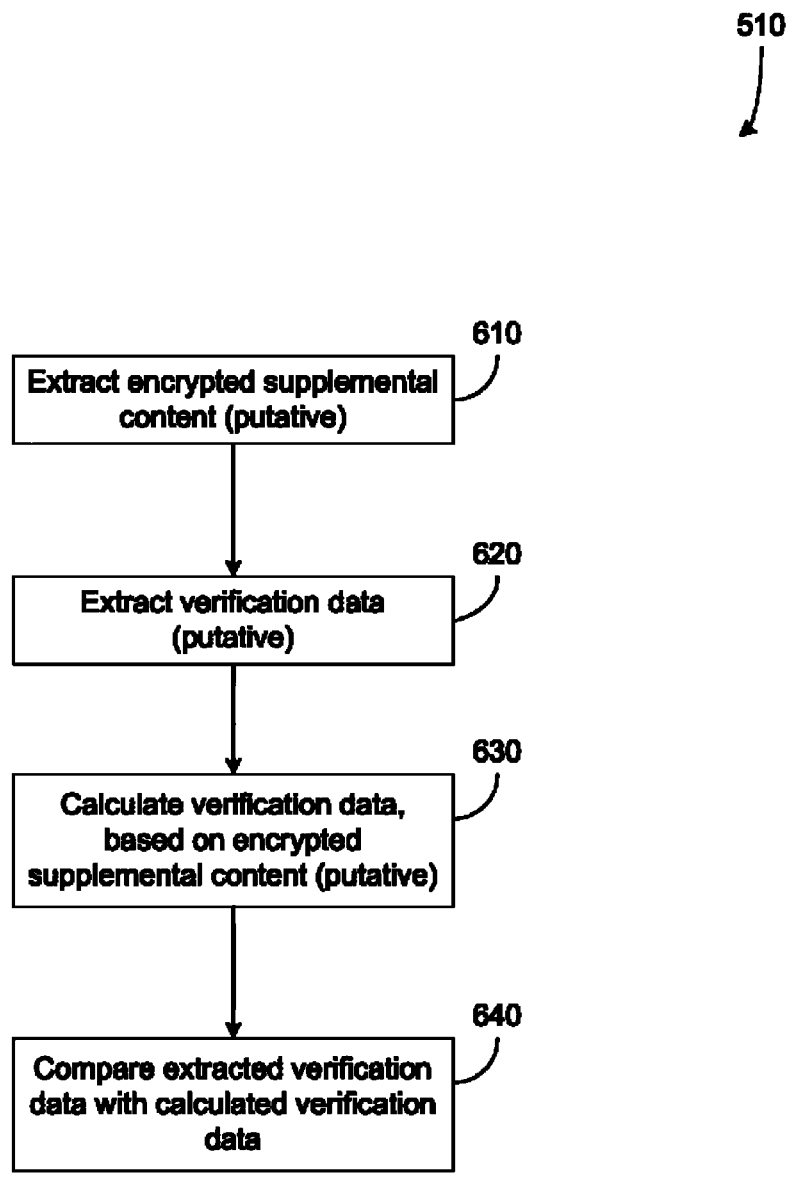
FIG. 6 is a flowchart illustrating the detection of supplemental content, according to an embodiment.

The determination as to whether supplemental content is present is illustrated in FIG. 6 according to an embodiment. At 610, the encrypted supplemental content may be extracted from the aggregated content. At this point in the processing, however, it has not yet been determined that the supplemental content is present. Therefore, the extracted data is only putatively encrypted supplemental content. If there is no actual encrypted supplemental data present, this extraction may yield the original content bits that would have been replaced in a steganographic process, had such a process taken place. At 620, verification data may be extracted from the aggregated content. Again, the verification data extracted here may be putative, in that it may not be known at this point whether or not verification data is actually present. If not, this extraction may involve reading the bits that would have been substituted by verification data in the steganographic processing described above. At 630, verification data may be independently calculated based on the putative supplemental content. At 640, the resulting calculated verification data may be compared with the extracted putative verification data. If there is a match, then it may be inferred that the putative encrypted supplemental content is in fact encrypted supplemental content.

Figure 7:
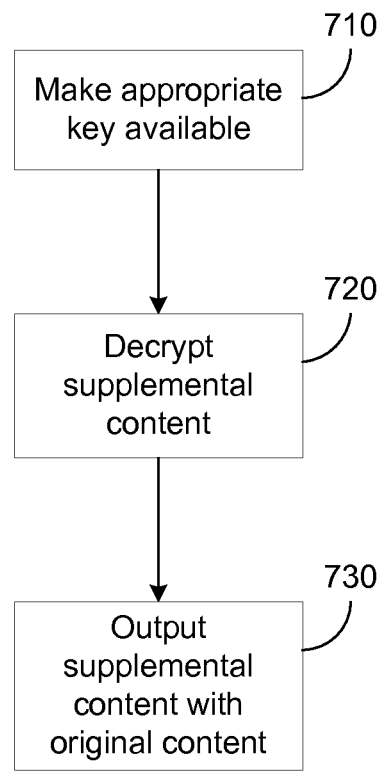
FIG. 7 is a flowchart illustrating the output of supplemental content and aggregated content, according to an embodiment.

The output of supplemental and original content (540 of FIG. 5) is illustrated in FIG. 7, according to an embodiment. At 710, the appropriate decryption key may be made available, where this decryption key may be used to decrypt the encrypted supplemental content at 720. At 730, the supplemental content may be output along with the original content.

Figure 8:
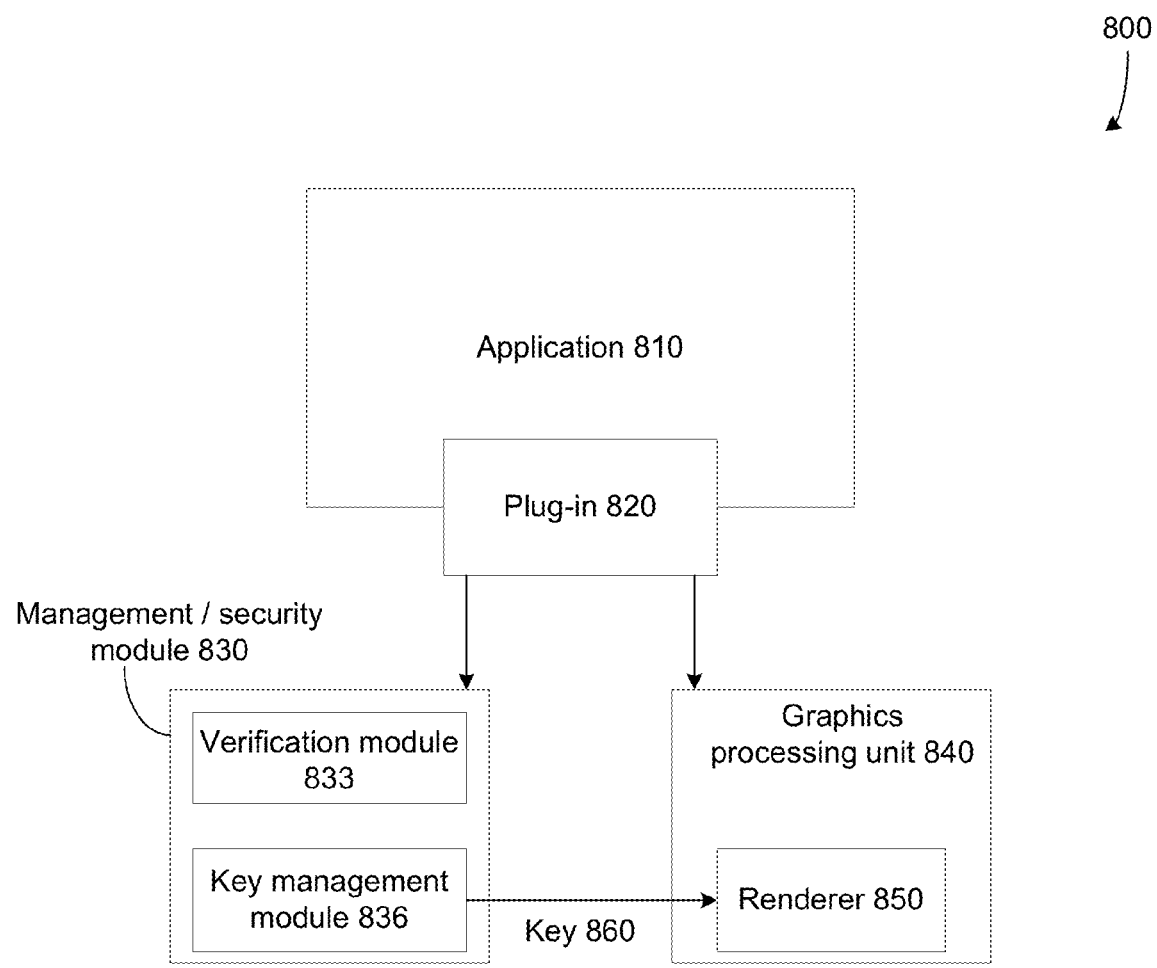
FIG. 8 is a block diagram illustrating an embodiment of a system for processing aggregated content.

A system 800 for processing aggregated content is illustrated in FIG. 8, according to an embodiment. An application 810 may be responsible for initially receiving and processing the aggregated content. If the aggregated content includes an image file, for example, application 810 may be a graphics processing application that includes a renderer. A plug-in 820 is also shown, and may be responsible for extracting putative encrypted supplemental content and verification data from the aggregated content. The putative encrypted supplemental content and verification data may be passed to a management and security module 830. This module may be implemented in software, firmware, hardware, or any combination thereof. Here, a verification module 833 may determine or verify that the aggregated content in fact contains actual encrypted supplemental content. If so, and if the user is authorized to have access to the supplemental content, then a key management module 836 may release a decryption key 860 for use in decrypting the encrypted supplemental content. In the embodiment, the key management module 836 may also be responsible for establishing the authorization of the user before releasing the decryption key. Moreover, if supplemental content is detected and if the user is appropriately authorized to access this content, then the plug-in 820 will be allowed to release the supplemental content to a graphics processing unit (GPU) 840. The GPU 840 may include a renderer 850 which may decrypt the encrypted supplemental content using the decryption key. The renderer 850 may then render the supplemental content. In an embodiment, the rendered aggregated content may be passed from the application 810 to the GPU 840, where it may be combined with the rendered supplemental content before output. In this sense, GPU 840 may be viewed as an output module. In an alternative embodiment, the renderer 850 may render both the supplemental content and the original content.

Figure 9:
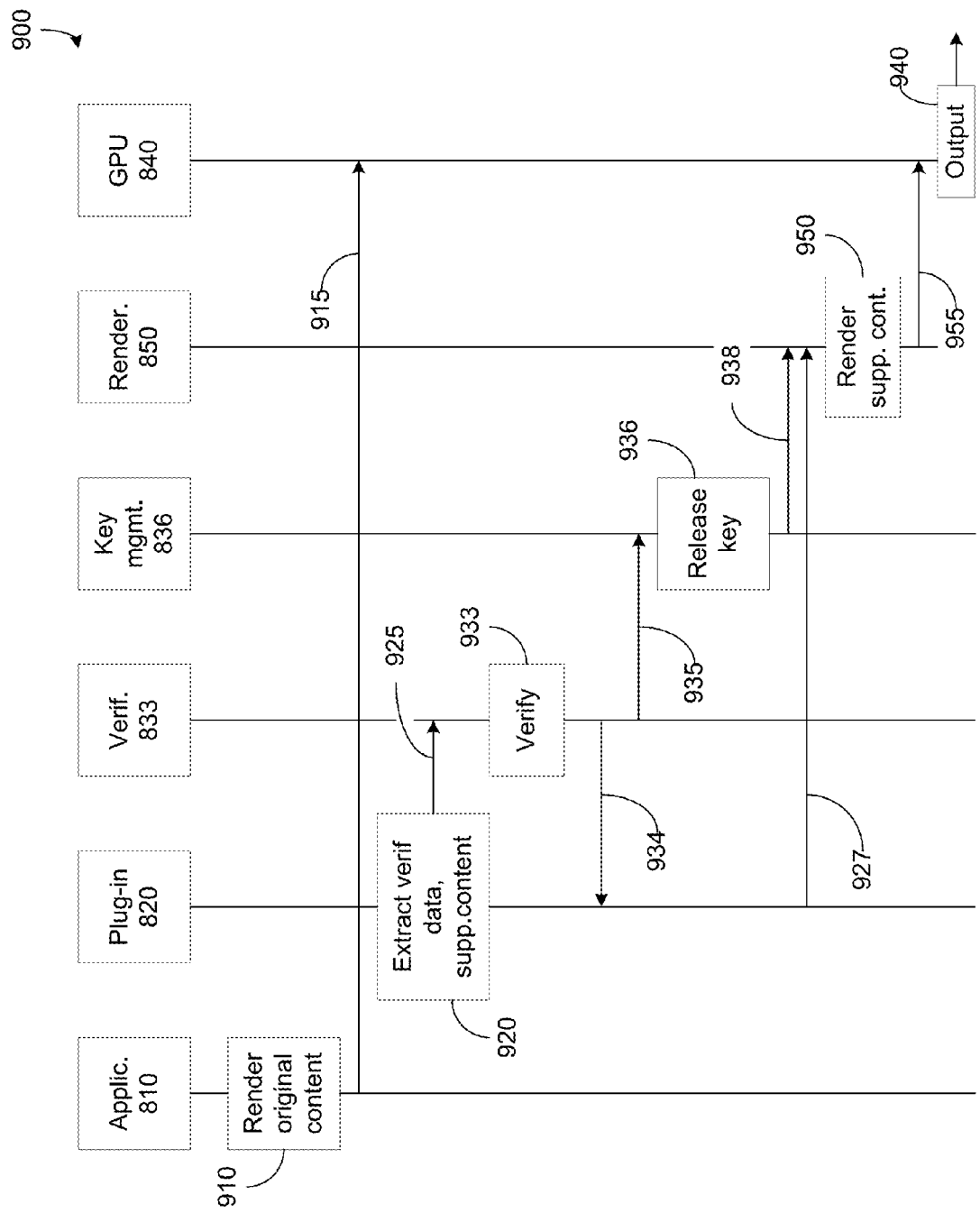
FIG. 9 is a timeline illustrating the processing of aggregated content, according to an embodiment.

The operation of system 800 is illustrated as a timeline 900 in FIG. 9, according to an embodiment. Here, the application 810 may render the aggregated content at 910. The result of this rendering is shown as output 915. The plug-in 820 may extract the putative verification data and supplemental content at 920. The putative verification data and supplemental content is shown as 925, and may be passed to verification module 833. If verification (933) is successful, i.e., if actual supplemental content is detected, then the plug-in 820 may be so informed (934), and key management module 836 may also be informed (935). If key management module 836 determines that the user is authorized to access the supplemental content, then the appropriate decryption key (938) may be released at 936 and provided to renderer 850. The renderer 850 may then decrypt encrypted supplemental content 927 and render the resulting supplemental content at 950. The output of renderer 850 may include the rendered supplemental content (shown here as 955), which may be output at 940, along with the rendered aggregated content 915.

The aggregated content 915 may therefore have the supplemental content 955 securely integrated therein, in encrypted form. As discussed, someone who is authorized to access the supplemental content 955 may be granted a decryption key 938 enabling him to decrypt the encrypted supplemental content 927. Such a person may therefore be able to access supplemental content 955, in addition to accessing the original content. In contrast, someone who is not authorized to access the supplemental content 955 may not be given the appropriate decryption key. Such a party may be able to access the original content in integrated content 915, but may be unable to decrypt the encrypted supplemental content 927, and therefore may be unable to access the supplemental content 955. This may be true even though the supplemental content 955 is present in the aggregated content 915, in the form of encrypted supplemental content 927.

Returning to the example of FIGS. 1A and 1B, FIG. 1A may represent original content, while FIG. 1B may represent original content plus supplemental content (i.e., the employee's cell phone number and employee ID). An authorized party may be able to see the original content, and to decrypt and see the supplemental content (i.e., FIG. 1B). A party lacking such authorization may see only the original content shown in FIG. 1A. This may be true, even though the supplemental content is present (in encrypted form) in the aggregated content received by both parties. The supplemental content may be visible only to the authorized party. A party who is not authorized to access the supplemental content may not even be aware of the presence of the encrypted supplemental content in the aggregated content.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The term software, as used herein, may refer to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory, read-only memory, or other data storage device.

Figure 10:
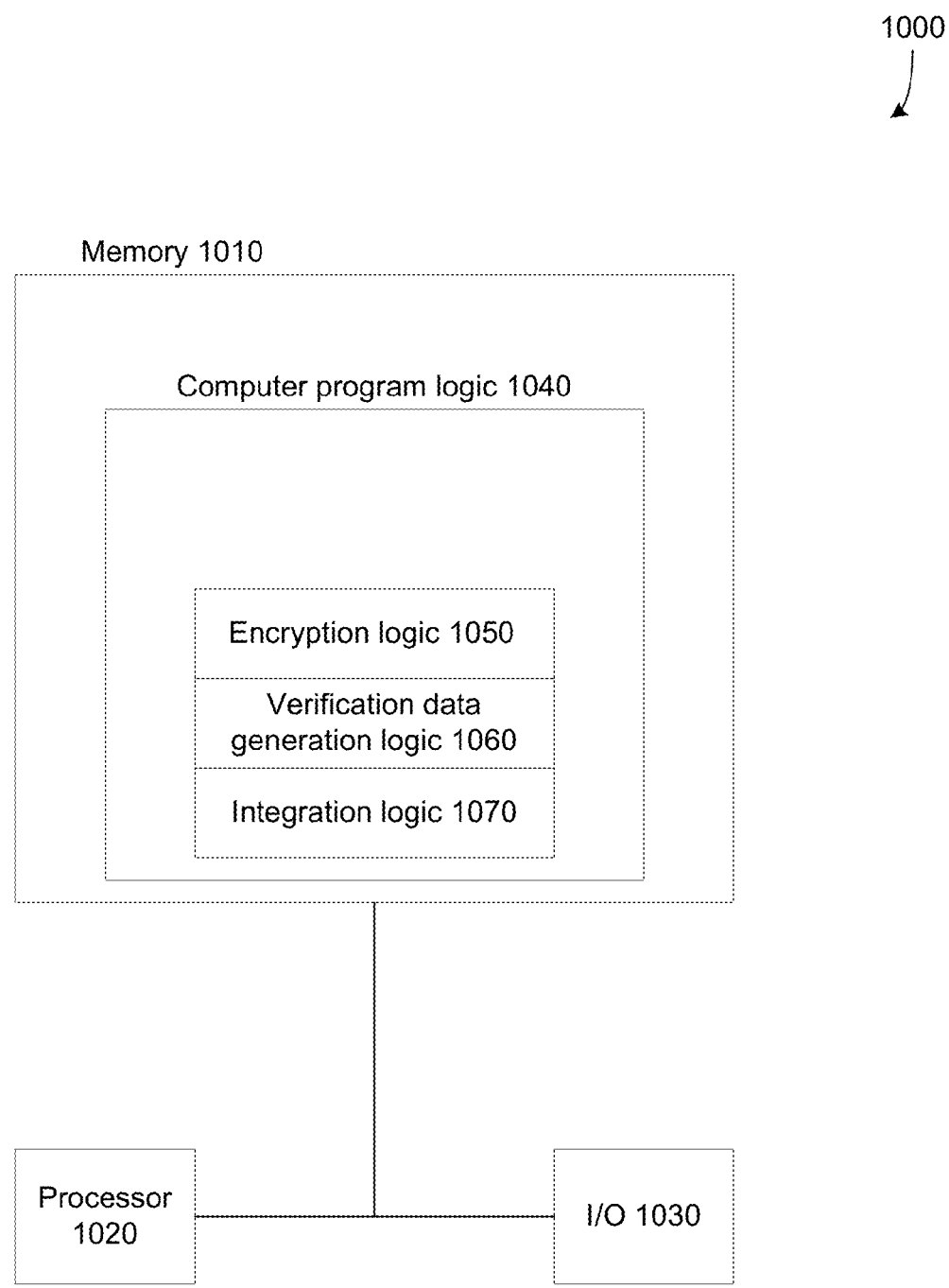
FIG. 10 is a block diagram illustrating a computing environment for the creation of aggregated content, according to an embodiment.

A computing system that executes such software/firmware is shown in FIG. 10, according to an embodiment. The illustrated system 1000 may be used to create aggregated content. System 1000 may include one or more processor(s) 1020 and may further include a body of memory 1010. Processor(s) 1020 may include one or more central processing unit cores and/or a graphics processing unit having one or more GPU cores. Memory 1010 may include one or more computer readable media that may store computer program logic 1040. Memory 1010 may be implemented as a hard disk and drive, a removable media such as a compact disk, a read-only memory (ROM) or random access memory (RAM) device, for example, or some combination thereof. Processor(s) 1020 and memory 1010 may be in communication using any of several technologies known to one of ordinary skill in the art, such as a bus. Computer program logic 1040 contained in memory 1010 may be read and executed by processor(s) 1020. One or more I/O ports and/or I/O devices, shown collectively as I/O 1030, may also be connected to processor(s) 1020 and memory 1010.

Computer program logic 1040 may include logic that embodies the processing described above with respect to creation of aggregated content. In the illustrated embodiment, computer program logic 1040 may include encryption logic 1050, which may be responsible for encrypting supplemental content. As noted above, the encryption algorithm embodied by encryption logic 1050 may be any algorithm known to persons of ordinary skill in the art, such as a symmetric key algorithm or a public asymmetric key algorithm. Computer program logic 1040 may also include verification data generation logic 1060, which may be responsible for the generation of verification data based on the encrypted supplemental content. As discussed above, the generation of verification data may include the generation of a CRC or other verification data that is a function of the encrypted supplemental content. Computer program logic 1040 may also include integration logic 1070, for the integration of supplemental content and verification data into original content. As described above, the integration process may include steganographic techniques.

Figure 11:
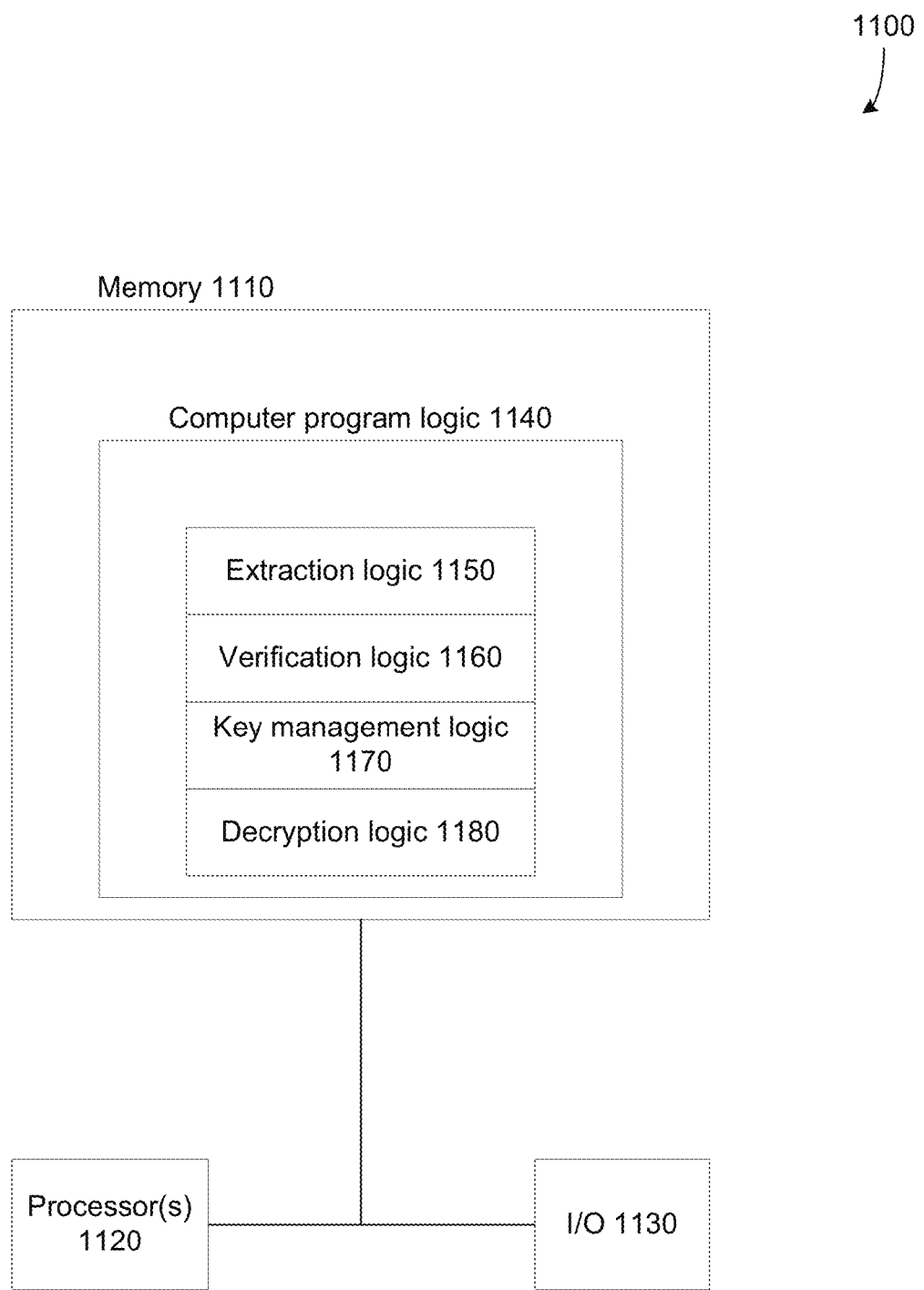
FIG. 11 is a block diagram illustrating a computing environment for the processing of aggregated content, according to an embodiment.

The illustrated system 1100 of FIG. 11 may be used to process aggregated content. System 1100 may include one or more processor(s) 1120 and may further include a body of memory 1110. Processor(s) 1120 may include one or more central processing unit cores and/or a graphics processing unit having one or more GPU cores. Memory 1110 may include one or more computer readable media that may store computer program logic 1140. Memory 1110 may be implemented as a hard disk and drive, a removable media such as a compact disk, a read-only memory (ROM) or random access memory (RAM) device, for example, or some combination thereof. Processor(s) 1120 and memory 1110 may be in communication using any of several technologies known to one of ordinary skill in the art, such as a bus. Computer program logic 1140 contained in memory 1110 may be read and executed by processor(s) 1120. One or more I/O ports and/or I/O devices, shown collectively as I/O 1130, may also be connected to processor(s) 1120 and memory 1110.

Computer program logic 1140 may include extraction logic 1150, which may be responsible for the extraction of supplemental content and verification data from received aggregated content. Extraction logic 1150 may be implemented in a plug-in to an application program, as noted above.

Computer program logic 1140 may also include verification logic 1160, which may be responsible for verifying the presence of supplemental content, using the verification data as described above. Computer program logic 1140 may also include key management logic 1170, which may be responsible for issuing a decryption key for the decryption of encrypted supplemental content if the user has the proper authorization.

Note that while verification logic 1160 and key management logic 1170 are shown as executing on the same processor(s) 1120 as the other logic modules, in an alternative embodiment logic 1170 and 1160 may execute on a separate processor, or may be implemented in hardware in a separate component, such as a management and security module as shown in FIG. 8.

Computer program logic 1140 may also include decryption logic 1180, which may be responsible for decryption of encrypted supplemental content. Again, while decryption logic 1180 is shown as executing on the same processor(s) 1120 as the other logic modules, in an alternative embodiment logic 1180 may execute on a separate processor, such as a GPU as shown in FIG. 8.

Figure 12:
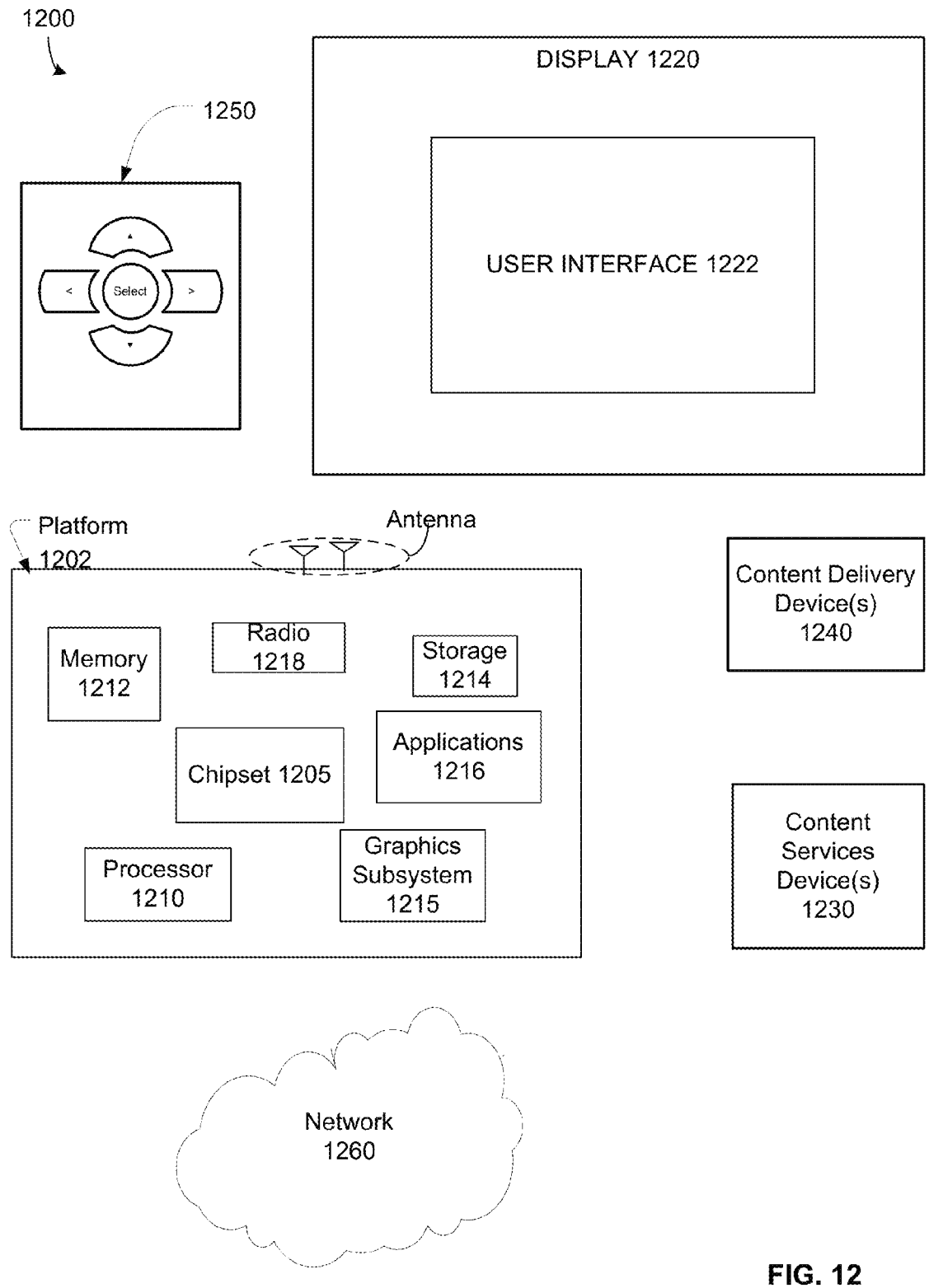
FIG. 12 is a block diagram illustrating an information system that may incorporate the system described herein, according to an embodiment.

A system for processing aggregated content, such as the systems illustrated in FIGS. 8 and 11, may be a part of a larger information system. FIG. 12 illustrates such an embodiment. In embodiments, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1200 comprises a platform 1202 coupled to a display 1220. Platform 1202 may receive content from a content device such as content services device(s) 1230 or content delivery device(s) 1240 or other similar content sources. A navigation controller 1250 comprising one or more navigation features may be used to interact with, for example, platform 1202 and/or display 1220. Each of these components is described in more detail below.

In embodiments, platform 1202 may comprise any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1210 may comprise dual-core processor(s), dual-core mobile processor(s), and so forth. In an embodiment, processor 1210 may correspond to processor 1120 of FIG. 11.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1214 may comprise technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 could be integrated into processor 1210 or chipset 1205. Graphics subsystem 1215 could be a stand-alone card communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1218 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In embodiments, display 1220 may comprise any monitor or display. Display 1220 may comprise, for example, a computer display screen, touch screen display, video monitor, television-like device, and/or a television. Display 1220 may be digital and/or analog. In embodiments, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In embodiments, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In embodiments, content services device(s) 1230 may comprise a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 receives content such as cable television programming including media information, digital information, and/or other content. Examples of content providers may include any cable or satellite television or radio or Internet content providers. The provided examples are not meant to limit embodiments of the invention.

In embodiments, platform 1202 may receive control signals from navigation controller 1250 having one or more navigation features. The navigation features of controller 1250 may be used to interact with user interface 1222, for example. In embodiments, navigation controller 1250 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be echoed on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In embodiments, controller 1250 may not be a separate component but integrated into platform 1202 and/or display 1220. Embodiments, however, are not limited to the elements or in the context shown or described herein.

In embodiments, drivers (not shown) may comprise technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 when the platform is turned "off." In addition, chip set 1205 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content services device(s) 1230 may be integrated, or display 1220 and content delivery device(s) 1240 may be integrated, for example. These examples are not meant to limit the invention.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
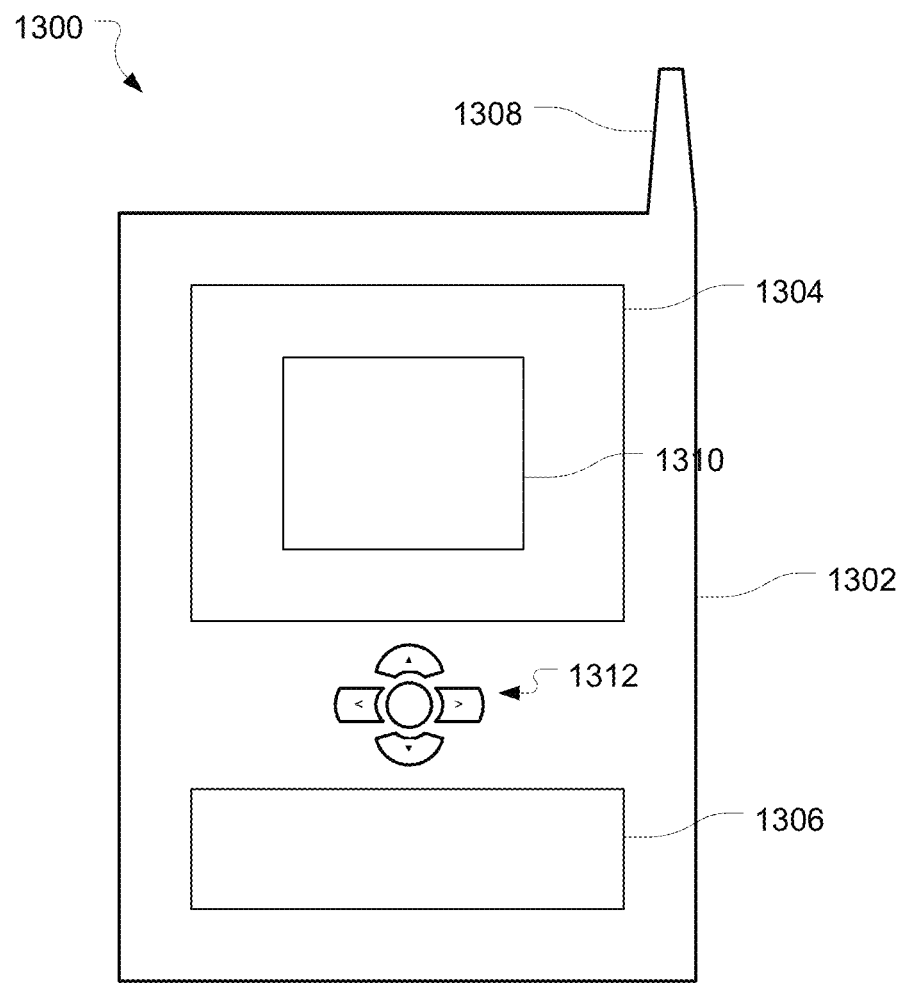
FIG. 13 is a block diagram illustrating a mobile information system that may incorporate the system described herein, according to an embodiment.

As described above, system 1200 may be embodied in varying physical styles or form factors. FIG. 13 illustrates embodiments of a small form factor device 1300 in which system 1200 may be embodied. In embodiments, for example, device 1300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may comprise a housing 1302, a display 1304, an input/output (I/O) device 1306, and an antenna 1308. Device 1300 also may comprise navigation features 1312. Display 1304 may comprise any suitable display unit for displaying information 1310 appropriate for a mobile computing device. I/O device 1306 may comprise any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone. Such information may be digitized by a voice recognition device. The embodiments are not limited in this context.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   encrypting, by a computing device, supplemental content;
   generating, by the computing device, verification data on the basis of the encrypted supplemental content; and
   replacing, by the computing device, a subset of bits in original content with the encrypted supplemental content and the verification data, wherein the subset is determined according to a predefined pattern, producing aggregated content, wherein the verification data is an indicator that supplemental content is present in the aggregated content, and wherein an initial bit of the subset is a member of a byte or pixel of the original content uniquely selected as a starting byte or pixel for bit replacement.

2. The method of claim 1, further comprising:
   making the aggregated content available to a user.

3. The method of claim 1, wherein the original content comprises one or more of an image file and an audio file.

4. The method of claim 1, wherein the original content comprises an image file and the replaced bits in the original content comprise one or more least significant bits in color coordinates of pixels of the image file.

5. The method of claim 1, wherein one or more of said encrypting, said generating, and said replacing is performed by a plug-in to an application program with which the original content is processed.

6. A computer program product comprising a non-transitory computer useable medium having control logic stored therein, the computer control logic comprising:
   logic to cause a processor to encrypt supplemental content;
   logic to cause the processor to generate verification data on the basis of the encrypted supplemental content; and
   logic to cause the processor to replace a subset of bits in original content with the encrypted supplemental content and the verification data, wherein the subset is determined according to a predefined pattern, producing aggregated content, wherein the verification data is an indicator that supplemental content is present in the aggregated content, and wherein an initial bit of the subset is a member of a byte or pixel of the original content uniquely selected as a starting byte or pixel for bit replacement.

7. The computer program product of claim 6, the computer control logic further comprising:
   logic to cause the processor to make the aggregated content available to a user.

8. The computer program product of claim 6, wherein the original content comprises one or more of an image file and an audio file.

9. The computer program product of claim 6, wherein the original content comprises an image file and the replaced bits in the original content comprise one or more least significant bits in color coordinates of pixels of the image file.

10. The computer program product of claim 6, wherein one or more of said logic to cause the processor to encrypt, said logic to cause the processor to generate, and said logic to cause the processor to replace a subset of the bits in original content is incorporated in a plug-in to an application program with which the original content is processed.

11. A computing device, comprising:
    an encryption module, configured to encrypt supplemental content;
    a verification data generation module, configured to generate verification data on the basis of encrypted supplemental content; and
    an integration module, configured
       to replace a subset of bits in original content with bits of the encrypted supplemental content and the verification data, wherein the subset is determined according to a predefined pattern, and wherein an initial bit of the subset is a member of a byte or pixel of the original content uniquely selected as a starting byte or pixel for bit replacement, and
       to produce aggregated content, wherein the verification data is an indicator that supplemental content is present.

12. The system of claim 11, wherein the original content comprises one or more of an image file and an audio file.

13. The system of claim 11, wherein the original content comprises an image file, and the replaced bits in the original content comprise one or more least significant bits in color coordinates of pixels of the image file.

14. The system of claim 11, wherein one or more of the encryption module, the verification data generation module, and the integration module are incorporated in a plug-in to an application module with which the original content is processed.

15. A method, comprising:
    determining, by a computing device, if supplemental content is present in aggregated content, wherein the aggregated content includes original content, and wherein the determining if the supplemental content is present comprises:
       extracting putative supplemental content from the aggregated content;
       extracting verification data from the aggregated content;
       calculating verification data, based on the putative supplemental content;
       comparing the calculated verification data with the extracted verification data; and
       if the calculated verification data matches the extracted verification data, determining that supplemental content is present in the aggregated content;

if so, determining, by the computing device, if a user of the original content is authorized to access the supplemental content; and if so,
- decrypting, by the computing device, the supplemental content using a cryptographic key;
- outputting, by the computing device, the original content for presentation to the user; and
- outputting, by the computing device, the decrypted supplemental content for presentation to the user.

16. The method of claim 15, wherein the original content comprises one or more of an image file and an audio file.

17. The method of claim 15, wherein the extracting of the putative supplemental content is performed by a plug-in to an application program processing the aggregated content.

18. The method of claim 15, wherein the original content comprises an image file, and said extraction of putative supplemental content comprises reading one or more least significant bits from color coordinates of pixels of the image file.

19. The method of claim 15, further comprising:
if the user is not authorized to access the supplemental content, withholding the cryptographic key and preventing decryption of the supplemental content for the user.

20. A computer program product comprising a non-transitory computer useable medium having control logic stored therein, the computer control logic comprising:
logic to cause a processor to determine if supplemental content is present in aggregated content, wherein the aggregated content includes original content, and wherein the logic to cause the processor to determine the presence of the supplemental content comprises:
- logic to cause the processor to extract putative supplemental content from the aggregated content;
- logic to cause the processor to extract verification data from the aggregated content;
- logic to cause the processor to calculate verification data, based on the putative supplemental content;
- logic to cause the processor to compare the calculated verification data with the extracted verification data; and
- logic to cause the processor to determine that supplemental content is present in the aggregated content, if the calculated verification data matches the extracted verification data;

logic to cause the processor to determine if a user of the original content is authorized to access the supplemental content if supplemental content is found to be present; and logic to cause the processor to decrypt the supplemental content using a cryptographic key, output the original content for presentation to the user, and output the decrypted supplemental content for presentation to the user, if the user is determined to be authorized.

21. The computer program product of claim 20, wherein the original content comprises one or more of an image file and an audio file.

22. The computer program product of claim 20, wherein said logic to cause the processor to extract putative supplemental content comprises:
a plug-in to an application program processing the aggregated content.

23. The computer program product of claim 20, wherein the original content comprises an image file, and said logic to cause the processor to extract putative supplemental content comprises logic to cause the processor to read one or more least significant bits from color coordinates of pixels of the image file.

24. The computer program product of claim 20, further comprising:
logic to cause the processor to withhold the cryptographic key and to prevent decryption of the supplemental content for the user if the user is not authorized to access the supplemental content.

25. A computing device, comprising:
a plug-in to an application program that is configured to process aggregated content, wherein the plug-in is configured to extract putative verification data and putative supplemental content from the aggregated content, and wherein the aggregated content includes original content;

a management and security module in communication with said plug-in, configured
- to receive the putative supplemental content,
- to determine if the aggregated content contains encrypted supplemental content by:
  - receiving the extracted putative verification data from the plug-in;
  - calculating verification data on the basis of the putative supplemental content; and
  - comparing the calculated verification data with the extracted putative verification data, wherein if the calculated verification data matches the extracted putative verification data, the supplemental content is determined to be present in the aggregated content, and
- to make a decryption key available to decrypt the encrypted supplemental content if a user of the original content is authorized to access the supplemental content; and an output module in communication with said plug-in and the management and security module and configured to decrypt the encrypted supplemental content if the user is authorized to access the supplemental content, and output the original content and the decrypted supplemental content for presentation to the authorized user.

26. The system of claim 25, wherein the original content comprises one or more of an image file and an audio file.

27. The system of claim 26, wherein the original content comprises an image file and the extraction comprises reading one or more least significant bits from color coordinates of pixels of the image file.

28. The system of claim 25, wherein the management and security module is further configured to determine if the user of the original content is authorized to access the supplemental content.

29. The system of claim 28, wherein the management and security module is further configured to withhold the decryption key if the user of the original content is not authorized to access the supplemental content.

30. The system of claim 25, wherein
the aggregated content comprises an image file, and
the output module comprises a renderer and is further configured to render the decrypted supplemental content if the user is authorized to access the supplemental content.

* * * * *